US009955085B2

(12) United States Patent
Sachs et al.

(10) Patent No.: US 9,955,085 B2
(45) Date of Patent: Apr. 24, 2018

(54) ADAPTIVE BRACKETING TECHNIQUES

(71) Applicant: Apple Inc., Cupertino, CA (US)

(72) Inventors: Todd S. Sachs, Palo Alto, CA (US);
Garrett M. Johnson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 11 days.

(21) Appl. No.: 15/273,215

(22) Filed: Sep. 22, 2016

(65) Prior Publication Data
US 2018/0084181 A1 Mar. 22, 2018

(51) Int. Cl.
H04N 5/235 (2006.01)
H04N 5/21 (2006.01)

(52) U.S. Cl.
CPC ........... H04N 5/2356 (2013.01); H04N 5/211 (2013.01); H04N 5/2353 (2013.01)

(58) Field of Classification Search
None
See application file for complete search history.

(56) References Cited

U.S. PATENT DOCUMENTS 7,239,757 B2 * 7/2007 Kang ................. G06T 5/50 348/E5.034
9,055,231 B2 6/2015 Garten
9,218,653 B2 12/2015 Prabhudesai
2013/0329092 A1 * 12/2013 Wong ................. H04N 5/2356 348/241
2015/0078661 A1 * 3/2015 Granados ............... G06T 5/009 382/167
2015/0195441 A1 7/2015 Chen
2017/0154456 A1 * 6/2017 Cao ..................... G06T 11/60

FOREIGN PATENT DOCUMENTS

WO 2014206503 A1 12/2014
WO 2015014286 A1 2/2015

* cited by examiner

Primary Examiner — James Hannett
(74) Attorney, Agent, or Firm — Blank Rome LLP

(57) ABSTRACT

Adaptive bracketing techniques for photography are described. An adaptive bracketing logic/module directs an imaging device to capture an adaptive bracket. The adaptive bracket can include a first image captured at a first exposure value, a second image captured at a second exposure value, and a third image captured at the first exposure value. The first exposure value can be underexposed in comparison to the second exposure value. The adaptive bracketing logic/module can determine that a difference between the first and second images; determine that the third image is more similar to the second image than the first image; and generate a composite image using the first image and the third image. The adaptive bracketing logic/module can also update the adaptive bracket to include the composite image. Optionally, the updated adaptive bracket can be used to generate one or more high dynamic range (HDR) images. Other embodiments are described.

21 Claims, 6 Drawing Sheets

ADAPTIVE BRACKETING TECHNIQUES

FIELD

Embodiments described herein relate to digital image processing. More particularly, the embodiments described herein relate to adaptive bracketing techniques for photography.

BACKGROUND INFORMATION

In photography, a bracketing technique refers to a process of capturing a sequence of images that can be used to generate a high dynamic range ("HDR") image. Such a sequence of images can be referred to as a bracketed sequence of images or a bracket. In at least one conventional bracketing technique, a bracket is fixed. That is, a predetermined number of images form the bracket, with each image being captured at a different exposure value or EV. An example of a conventional fixed bracket is represented as follows:

[$n$(EV−),EV0,$n$(EV+)], where EV0 refers to an image that is captured using an ideal exposure value (EV) given the lighting conditions at hand, where n refers to a number of stops above or below the EV0 image, where $n$(EV−) refers to an underexposed image that is captured at n lower stops than the EV0 image, and where $n$(EV+) refers to an overexposed image that is captured at n higher stops than the EV0 image.

In the conventional fixed bracket shown above, "EV" stands for exposure value and refers to a given exposure level for an image (which may be controlled by one or more settings of a device, such as an imaging device's shutter speed and/or aperture setting). Different images may be captured at different EVs, with a one EV difference (also known as a "stop") between images equating to a predefined power difference in exposure. Typically, a stop is used to denote a power of two difference between exposures. Thus, changing the exposure value can change an amount of light received for a given image, depending on whether the EV is increased or decreased. For example, one stop doubles or halves the amount of light received for a given image, depending on whether the EV is increased or decreased, respectively.

The "EV0" image in a conventional fixed bracket refers to an image that is captured using an exposure value as determined by an imaging device's exposure algorithm. Generally, the EV0 image is assumed to have the ideal exposure value (EV) given the lighting conditions at hand. The "EV−" image of a fixed bracket refers to an underexposed image that is captured at a lower stop (e.g., 0.5, 1, 2, or 3 stops) than the EV0 image. For example, a "1EV−" image refers to an underexposed image that is captured at one stop below the exposure value of the EV0 image. The "7 EV+" image refers to an overexposed image that is captured at a higher stop (e.g., 0.5, 1, 2, or 3) than the EV0 image. For example, a "2EV+" image refers to an overexposed image that is captured at two stops above the exposure value of the EV0 image.

During HDR image creation, one limitation of fixed brackets is the presence of ghosting artifacts that can appear when objects move, appear, or disappear during the capturing of individual images the bracket. For example, during the shooting of three images that are subsequently used for generating an HDR image, if a person is captured in the first image (but not the second and third images), then the HDR image created from the three images can include a semi-transparent figure of the person over the scene. This unwanted ghosting artifact is also known as a ghost.

SUMMARY

Embodiments of methods, apparatuses, and systems for adaptive bracketing techniques are described. Such embodiments can assist with reducing unwanted ghosting artifacts in a high dynamic range ("HDR") image generated from an adaptively bracketed sequence of images (also referred to herein as an adaptive bracket). For one embodiment, the adaptive bracket is a bracketed sequence of images that includes at least one of: (i) two or more images that were captured at different times using the same exposure value; or (ii) a composite image that is generated using the two or more images.

For one embodiment, an adaptive bracketing logic/module directs an imaging device (e.g., imaging sensor(s) and/or corresponding camera circuitry, etc.) to capture an adaptive bracket. The adaptive bracket can include a first image captured at a first exposure value and a second image captured at a second exposure value that is different from the first exposure value. For one embodiment, the first exposure value is underexposed in comparison to the second exposure value.

The adaptive bracketing logic/module can compare the first image to the second image to determine a difference between the first and second images. This difference can be caused by at least one of the following: (i) motion—that is, one or more moving, appearing, or disappearing objects that occur after the first image is captured but before the second image is captured (and vice versa); or (ii) noise—that is, random variations in corresponding image data that occurs after the first image is captured but before the second image is captured (and vice versa). For one embodiment, the adaptive bracketing logic/module determines a difference between the first and second images using a pixel-by-pixel comparison of one or more pixels in the second image with corresponding pixels in the first image. For another embodiment, the adaptive bracketing logic/module determines a difference between the first and second images using one or more image registration algorithms that facilitate comparisons between the first and second images.

For one embodiment, the adaptive bracketing logic/module captures a third image that is included in the adaptive bracket. For one embodiment, the third image is captured using the same exposure value as the first image (i.e., the first exposure value). For one embodiment, the adaptive bracketing logic/module directs the imaging device to capture the third image as part of the adaptive bracket after the imaging device has captured the first and second images of the adaptive bracket. For a further embodiment, the adaptive bracketing logic/module directs the imaging device to capture the third image in response to the adaptive bracketing logic/module determining a difference between the first and second images. For an alternate embodiment, the imaging device captures the third image prior to the adaptive bracketing logic/module determining a difference between the first and second images.

For one embodiment, the adaptive bracketing logic/module compares the first and third images to determine whether the third image is better than the first image—that is, whether the third image is more similar to the second image than the first image. For one embodiment, the adaptive bracketing logic/module determines whether the third image is better than the first image in response to the adaptive bracketing logic/module determining a difference between the first and second images.

For one embodiment, the adaptive bracketing logic/module generates a composite image using the first image and the third image. The adaptive bracketing logic/module can generate the composite image in response to the adaptive bracketing logic/module determining that the third image is better than the first image. For one embodiment, the adaptive bracketing logic/module generates a composite image by combining the first image and the third image. Combining the first image and the third image can include at least one of: (i) blending one or more portions of the first image with corresponding portion(s) of the third image; or (ii) replacing one or more portions of the first image with corresponding portion(s) of the third image.

The adaptive bracketing logic/module can also update the adaptive bracket by replacing the first and third images with the composite image. Optionally, the updated adaptive bracket can be used to generate one or more HDR images.

Other features or advantages of the embodiments described herein will be apparent from the accompanying drawings and from the detailed description that follows below.

BRIEF DESCRIPTION OF THE DRAWINGS

Embodiments described herein are illustrated by way of example and not limitation in the figures of the accompanying drawings, in which like references indicate similar features. Furthermore, in the figures some conventional details have been omitted so as not to obscure the inventive concepts described herein.

DETAILED DESCRIPTION

Embodiments of methods, apparatuses, and systems for adaptive bracketing techniques are described. One or more of these embodiments can assist with reducing unwanted ghosting artifacts in a high dynamic range ("HDR") image generated from an adaptively bracketed sequence of images (also referred to herein as an adaptive bracket).

Embodiments of the adaptive bracketing techniques set forth herein can assist with improving the functionality of computing devices or systems that generate HDR images. More specifically, computer functionality can be improved by enabling computing devices or systems that use an adaptive bracket for generating HDR images to reduce or eliminate the need to use de-ghosting algorithms on the generated HDR images. In this way, an adaptive bracket can assist with reducing or eliminating wasted computational resources (e.g., memory, processing power, computational time, etc.). For example, at least one embodiment of an adaptive bracket described herein includes a composite image formed from two or more images of the adaptive bracket that were captured at different times using the same settings. For this example, the composite image can assist with reducing the likelihood that the adaptive bracket includes motion (e.g., moving, appearing, or disappearing objects, etc.) and/or noise. This reduced likelihood can, in turn, reduce the likelihood that ghosts are present in an HDR image generated from the adaptive bracket. Also, the reduced occurrence of ghosts can reduce or eliminate the need to devote computational resources to de-ghosting techniques. Reducing or eliminating computational resources devoted to de-ghosting techniques can, for example, improve the processing capabilities of the device or system.

Figure 1:
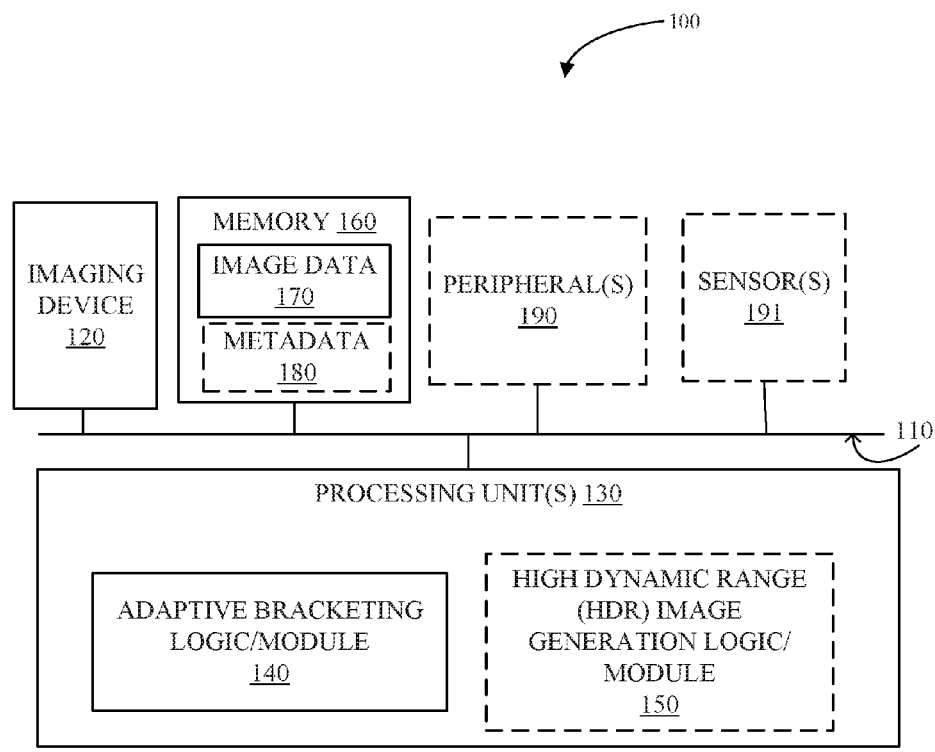
FIG. 1 is a block diagram of a processing system, which includes electronic components that can perform an adaptive bracketing technique according to one embodiment.

FIG. 1 is a block diagram of a processing system 100 that can perform an adaptive bracketing technique according to one embodiment. The system 100 can be housed in a single computing device, such as a desktop computer, a laptop computer, a tablet computer, a server, a mobile phone, a media player, a personal digital assistant (PDA), a personal communicator, a gaming device, a network router or hub, a wireless access point (AP) or repeater, a set-top box, or a combination thereof. Alternatively, the components of system 100 can be temporally separated and implemented on separate computing systems that are connected by the communication mechanism 110, which is described in further detail below.

For one embodiment, the system 100 may include processing unit(s) 130, which includes at least one of an adaptive bracketing logic/module 140 or an HDR image generation logic/module 150. The system 100 can also include a communication mechanism 110, memory 160 that includes at least one of image data 170 or metadata 180, an imaging device 120, peripheral(s) 190, and/or sensor(s) 191. Each of the logic/module 150, the metadata 180, the peripheral(s) 190, and the sensor(s) 191 is illustrated with a dashed box to show that it is an optional component of the system 100. Nevertheless, one or more of the logic/module 150, the metadata 180, the peripheral(s) 190, and the sensor(s) 191 is not always an optional component of the system 100—some embodiments of the system 100 may require at least one of the logic/module 150, the metadata 180, the peripheral(s) 190, or the sensor(s) 191 (e.g., a camera, a smartphone with a camera, etc.). Each component in the system 100 is described below.

As shown in FIG. 1, the system 100 can include all the necessary circuitry and memory for performing the techniques described herein. For one embodiment, the system 100 includes processing unit(s) 130, such as central processing units (CPUs), graphics processing units (GPUs), and other types of integrated circuits (ICs). For one embodiment, the processing unit(s) 130 enable the system 100 to manipulate computer graphics and/or perform image processing. For one embodiment, the processing unit(s) 130 includes an adaptive bracketing logic/module 140. The adaptive bracketing logic/module 140 can be implemented as at least one of hardware (e.g., electronic circuitry of the processing unit(s) 130, circuitry, dedicated logic, etc.), software (e.g., one or more instructions of a computer program executed by the processing unit(s) 130, software run on a general-purpose computer system or a dedicated machine, etc.), or a combination thereof. For one embodiment, the adaptive bracketing logic/module 140 performs at least one embodiment of an adaptive bracketing technique, as described herein.

For one embodiment, the adaptive bracketing logic/module 140 enables the system 100 to capture an adaptive bracket, which is a bracketed sequence of images that includes two or more images that were captured at different times using the same exposure value. Specifically, the adaptive bracketing logic/module 140 can direct the imaging device 120 to capture the adaptive bracket. For one embodiment, the imaging device 120 captures an adaptive bracket comprised of at least two images. For a first example, and for one embodiment, the imaging device 120 captures an adaptive bracket that is represented as follows:

$$[n_1(\text{First EV}-), \text{EV0}, n_2(\text{EV}+), n_1(\text{Second EV}-)],$$

where EV0 refers to an image that is captured using an ideal exposure value (EV) given the lighting conditions at hand, where $n_1$ and $n_2$ refer to numbers of stops below or above the EV0 image, respectively, where $n_1$(First EV−) refers to an underexposed image that is captured at $n_1$ lower stops than the EV0 image during a first time interval, where $n_1$(Second EV−) refers to an underexposed image that is captured at $n_1$ lower stops than the EV0 image during a second time interval that occurs after the first time interval, and where $n_2$(EV+) refers to an overexposed image that is captured at $n_2$ higher stops than the EV0 image.

While the first example above shows an order where the First EV− image is taken before both the EV0 and EV+ images and the Second EV− image is taken after both the EV0 and EV+ images, it should be appreciated that the images may be captured in other orders as appropriate. It should further be appreciated that when "first", "second" etc. are used to distinguish different images, that these designations do not require a sequential capture order. As a second example, and for one embodiment, the imaging device 120 captures an adaptive bracket where the First EV− image is captured before the EV0 image and the Second EV− image is captured after the EV0 image and before the EV+ image, represented as follows:

$$[n_1(\text{First EV}-), \text{EV0}, n_1(\text{Second EV}-), n_2(\text{EV}+)].$$

As a third example, in some instances the imaging device 120 captures an adaptive bracket where both the First and Second EV− images are captured before the EV0 and EV+ images, represented as follows:

$$[n_1(\text{First EV}-), n_1(\text{Second EV}-), \text{EV0}, n_2(\text{EV}+)].$$

While many examples of adaptive brackets described here (including those described immediately above) as having two EV− images having the same exposure value, it should be appreciated that capturing the adaptive bracket may include capturing additional EV− images as appropriate. Embodiments of an adaptive bracket described throughout this document can include two or more EV− images. For one example, an adaptive bracket includes only two EV− images that are captured at different times. In other instances, capturing the adaptive bracket includes capturing three or more EV− images. In some instances, one or more additional EV− images may have the same exposure value as the first and second EV− images (e.g., an $n_1$(First EV−) image, an $n_1$(Second EV−) image, and an $n_1$(Third EV−) image may be captured). Additionally or alternatively, one or more additional EV− images may have a different exposure value the first and second EV− images (e.g., an $n_1$(First EV−) image, an $n_1$(Second EV−) image, and an $n_3$(Third EV−) image may be captured, where the number of stops $n_1$ is different from the number of stops $n_3$). It should be appreciated that in some instances, the $n_1$ and $n_2$ number of stops may be the same (such that EV+ image is captured the same number of stops above the EV0 as the number of stops the EV− images are captured below the EV0 image) or may be different (such that the EV+ image is captured a different number of stops above the EV0 image than the number of stops the EV− images are captured below the EV0 image).

Similarly, while a single EV+ image is shown in the adaptive brackets above, it should be appreciated that multiple EV+ images may be captured during the capture of the adaptive bracket. In some instances, multiple EV+ images may have the same exposure value. Additionally or alternatively, one or more EV+ images may be at a different stop than one or more other EV+ images captured in the adaptive bracket. It should be appreciated that the number of images captured in an adaptive bracket may be fixed, or may be dynamic depending on analysis of one or more images of the adaptive bracket, as will be discussed in more detail below.

In some instances, a composite image may be formed from two or more images of the captured sequence of images. The composite image may be added to the bracket (e.g., may be saved with the other images from the adaptive bracket and/or may be used with other images from the bracket to form a HDR image), and optionally may replace one or more of the original images that were used to form the composite image. While many examples below discuss using captured EV− images to form a composite EV− image, it should be appreciated that other images (EV0 images and/or EV+ images may also be used to form composite images within the bracket. Accordingly, in some instances, the number of images saved as a bracket and/or used to form a HDR image may be less than the number of images initially captured as part of the adaptive bracket.

Returning to the examples described above, the first EV− image is an underexposed image that is captured at a predetermined number of lower stops than the EV0 image during a first time interval. The second EV− image is an underexposed image that is captured at the same predetermined number of lower stops as the first EV− image, but during a second time interval that occurs after the first time interval. As shown, the adaptive bracket differs from conventional fixed brackets because of the multiple EV− images having the same exposure value. The multiple EV− images of the adaptive bracket can assist with overcoming one or more limitations of a conventional fixed bracket. For example, and not by way of limitation, the adaptive bracket can assist with increasing the likelihood that the EV− and EV0 images used to generate a HDR image will not result in ghosting artifacts in the HDR image due to motion or other differences between the EV− and EV0 images.

Conventional de-ghosting techniques generally use information from the EV0 image to correct for ghosting artifacts found in an HDR image generated from a fixed bracket. Nevertheless, such conventional de-ghosting techniques cannot be used in situations where there are certain differences in image information between the EV− and EV0 images. These differences can be caused by at least one of the following: (i) motion—that is, one or more moving, appearing, or disappearing objects that occur after a first one of the EV− image and the EV0 image is captured but before the second one of the EV− image and the EV0 image is captured (and vice versa); or (ii) noise—that is, random variations in corresponding image data that occurs after the first one of the EV− image and the EV0 image is captured but before the second one of the EV− image and the EV0 image is captured (and vice versa). One or more embodiments of the adaptive bracket described herein can reduce the impact of these differences, which can assist with improving computer functionality by reducing or eliminating a need for additional de-ghosting algorithms for a system (e.g., the system 100) that generates HDR images using an adaptive bracket.

In some instances, the differences between images may be determined by evaluating the pixel values for one or more pixels of the images. Each pixel in an image may include a pixel value that represents that pixel's brightness and/or color. Depending on the nature of the image, the pixel value may include one or more individual values. For example, in a grayscale image, the pixel value may be a single number within a range representing the brightness of the pixel, where the minimum number in the range often represents black and the maximum number in the range often represents white. Grayscale imaging often uses an 8-bit integer range, with 0 as the minimum and 255 as the maximum. Conversely, in color imaging, the pixel value may include individual values reflecting different channels components of the color space used by the color model in a given image (e.g., a red-green-blue (RGB) color model, YUV, YCbCr, YPbPr, etc.). For example, an RGB image may include red, blue and green channels, and the pixel value for a given pixel may include a value for each channel.

Typically, the pixel value for each pixel may be set within a predefined range for each channel. Accordingly, each channel may have a respective maximum value. These maximum values reflect a maximum channel intensity that will be registered by the imaging device, and are often set based on the specific image sensor and/or the desired use of the imaging device. As an example, in a grayscale image where pixel brightness is reflected using a pixel value between 0 and 255, the maximum pixel value (255) may represent a threshold scene brightness. Even if the actual scene illumination on a pixel during image capture is brighter than the threshold scene brightness, the pixel value for that pixel will not exceed 255. In these instances, information in the image may be lost as it may not be possible to determine whether a pixel value of 255 was caused by scene illumination at the threshold scene brightness or a brighter level.

As used herein, a "clipped pixel," a "saturated pixel," and their variants refer to a pixel whose pixel value is equal to or greater than a threshold intensity value for a channel of the pixel. In some instances, the threshold intensity value may be the maximum intensity value for a given channel. When a pixel value includes multiple channels, it should be appreciated that each channel may have its own respective threshold intensity value. As an example, in some variations the pixel value may be represented by a plurality of channels, each having a respective value between a minimum of 0 and a maximum 255. In some instances, each channel may have a threshold intensity value of 255 (the maximum). In these instances, if the value of at least one of these channels is 255, the pixel may be considered a clipped pixel. In other instances, the threshold intensity value may be set below the maximum (e.g., to 247). In these instances, if the value of one of the channels meets or exceeds 247, the pixel may be considered a clipped pixel. It should be appreciated that the threshold intensity value or values may be changed depending on the intended use of the imaging device (e.g., different photography modes).

In one scenario, motion and/or noise that causes differences in corresponding portions of the EV− image and the EV0 image can be detected by looking for artifacts between the images. At least one of these artifacts may, in some instances, be identified by looking at the pixel values for one or more pixels of one or more of the images. One such artifact is an "occlusion" (also referred here as an "occluded portion"), where scene brightness changes between images for a portion of a scene by a threshold amount. For one example, if a person or other object in a scene moves between two images (e.g., an EV− image and an EV0 image) such that the EV− image is captured when the person or object (e.g., the person's head, etc.) is blocking out a bright light in a given region and the EV0 image is subsequently captured after the person or object (e.g., the person's head, etc.) is no longer blocking the bright light in that region, then there may be an increased difference in the brightness in that region between the EV− and EV0 images beyond what would normally be accounted for by the difference in exposure values between the images. This occlusion may result in one or more ghosting artifacts if the EV− and EV0 images are used to form a HDR image. Occlusions may result from motion, illumination changes, noise, or the like.

For one embodiment, the adaptive bracketing logic/module 140 compares one or more portions of the first EV− image to the EV0 image to determine a threshold difference (as described above) between corresponding portions in the first EV− image and the EV0 image. As will be described in more detail below, the identification of a threshold difference between the EV− and EV0 image may be used in determining whether to form a composite image or otherwise capture additional images. Several embodiments can be used to make this determination, which are described below.

For one embodiment, the adaptive bracketing logic/module 140 determines a threshold difference between corresponding portions in the first EV− image and the EV0 image by looking at the difference between the pixel value or values between one or more pixels of the first EV− image and the corresponding pixel or pixels from the EV0 image. In some instances, the adaptive bracketing logic/module 140 may count the number of pixels in a given region for which the difference between the pixel values for the EV− and EV0 images is equal to or greater than a threshold amount (also referred herein a "pixel difference threshold"). In instances where a pixel value has multiple channels, each channel may have a respective pixel difference threshold. It should be appreciated that image registration between the two images may be performed to correct for image shifts (e.g., due to camera motion) between the images, which may impact the association of pixel correspondence between the two images.

If the count meets a count threshold, the adaptive bracketing logic/module 140 may determine a threshold difference between the first EV− image and the EV0 image. The count threshold may be based on the entire image or may be based on individual regions of the image. For example, the system may determine whether the count across the entire image meets a first count threshold. Additionally or alternatively, the system may determine whether the count across a given sub-region meets a second count threshold. In these instances, the system may look at a plurality of sub-regions within the image. Different sub-regions of the plurality of sub-regions may or may not overlap, may be the same or different size, and/or may have the same or different count thresholds. Additionally, when a count is made across an entire image (or region thereof), it should also be appreciated that a count may similarly made across a downsampled version of the image (or region thereof)

In some instances, the pixel values may be compared for individual pixels in the two images, but it should also be appreciated that pixels values for one or more pixel groups (referred to herein as a "pixel neighborhood" or "neighborhood of pixels" herein) may also be compared in certain instances. For another embodiment, the adaptive bracketing logic/module 140 determines a difference between corresponding portions in the first EV– image and the EV0 image by determining that a difference between an overall pixel value for a pixel neighborhood in the first EV– image and an overall pixel value for a corresponding pixel neighborhood in the EV0 image is equal to or greater than a pixel difference threshold. The adaptive bracketing logic/module 140 may evaluate the count of pixel neighborhoods exceeding this pixel difference threshold between the two images. As with the above embodiments, a threshold may be determined if the count exceeds one or more count thresholds In these variations, a pixel neighborhood refers to a group of pixels having a predefined relationship with a given pixel. For a specific embodiment, a pixel neighborhood and its variations refer to a predetermined group of pixels centered around a reference pixel in a grid of pixels. For example, in a rectangular grid of pixels, a pixel that is not on the edge of the image may be adjacent to eight neighboring pixels, and as a result, a pixel neighborhood associated with that specific pixel can encompass that pixel and its eight neighboring pixels (i.e., nine pixels). A pixel neighborhood can also include a larger or smaller group of pixels having a specific relationship with a given pixel. Thus, a pixel neighborhood can encompass at least 2 pixels. For example, a pixel neighborhood can encompass 2 pixels, 3 pixels, 4 pixels, 5 pixels, 6 pixels, 16 pixels, 64 pixels, 256 pixels, 1024 pixels, etc. For one embodiment, the pixel neighborhood has an pixel value, which can be determined as predetermined combination of the pixel values for the pixels in the pixel neighborhood. Combinations include, but are not limited to, a sum of the individual pixels' values, an average of the individual pixels' values, a median of the individual pixels' values, and a vector of the individual pixels' values.

For yet another embodiment, the adaptive bracketing logic/module 140 determines a threshold difference between corresponding portions in the first EV– image and the EV0 image by: (i) aligning the objects in the EV0 image and the first EV– image using a local image registration technique; and (ii) detecting where local registration fails because of clipped or saturated pixels in the EV0 image. In these instances, a threshold difference may be determined when the number and/or size of local registration failures exceeds a given level.

For another embodiment, the adaptive bracketing logic/ module 140 determines a threshold difference between corresponding portions in the first EV– image and the EV0 image by: (i) capturing multiple EV0 images (or multiple first EV– images); and (ii) comparing the multiple EV0 images (or multiple first EV– images) to each other to determine whether a predetermined criteria (e.g., which may be indicative of moving, appearing, or disappearing objects in the scene) is met. This analysis generally includes a pixel-to-pixel comparison of corresponding pixels in the multiple EV0 images (or multiple first EV– images). For this embodiment, the adaptive bracketing logic/module 140 determines that corresponding portions of the first EV– image and the EV0 image are different in response to the adaptive bracketing logic/module 140 determining that the multiple EV0 images (or multiple first EV– images) include motion and/or noise. Consequently, the adaptive bracketing logic/module 140 determines that corresponding portions of the first EV– image and the EV0 image are not different in response to the adaptive bracketing logic/module 140 determining that the multiple EV0 images (or multiple first EV– images) do not include motion and/or noise.

For one embodiment, the adaptive bracketing logic/module 140 determines a threshold difference between corresponding portions in the first EV– image and the EV0 image using a comparison of clipped pixels of the EV0 image with corresponding pixels of the first EV– image. For one embodiment, the adaptive bracketing logic/module 140 begins determining a difference between corresponding portions in the first EV– image and the EV0 image in response to the logic/module 140 determining that the EV0 image has a threshold number of clipped pixels. In certain embodiments, the logic/module 140 determining that the EV0 image has a threshold number of clipped pixels includes determining that a first threshold number of clipped pixels exist across the entire EV0 image and/or a second threshold of clipped pixels exist in a contiguous region of the EV0 image. For one embodiment, when the adaptive bracketing logic/module 140 determines that the EV0 image has a threshold number of clipped pixels, then the adaptive bracketing logic/module 140 compares the first EV– image with the EV0 image on a pixel-by-pixel basis. For one embodiment, the adaptive bracketing logic/module 140 compares clipped pixels of the EV0 image with corresponding pixels of the first EV– image to determine whether a difference between pixel values of corresponding pixels of the first EV– image and the clipped EV0 image pixels exceeds or is equal to a threshold difference. When the difference between pixel values of at least one set of corresponding pixels of the first EV– image and the EV0 image exceeds or is equal to the threshold difference, the adaptive bracketing logic/module 140 determines that a difference exists between corresponding portions in the first EV– image and the EV0 image. For one embodiment, when a region in the EV0 image includes a threshold number of clipped pixels, then a corresponding region in the first EV– image should be at a level close to or above an exposure ratio between the EV0 image and the first EV– image. So, when the threshold difference between corresponding pixels in the first EV– image and the EV0 image does not track the exposure ratio between the EV0 image and the first EV– image, the adaptive bracketing logic/module 140 determines that the corresponding portions of the first EV0 image and the EV0 image are different.

As mentioned above, the adaptive bracketing logic/module 140 obtains or receives the different images that make up the adaptive bracket, the logic/module 140 can align or register these images with each other to compensate for any shifting between capturing images. For example, the adaptive bracketing logic/module 140 applies one or more image registrations to correct for global motion/camera shake between capturing the first EV– image and the EV0 image. In this way, the logic/module 140 uses image registration techniques to account for both global and local movement. Shifting during capturing of the adaptive bracket can occur due to at least one of the following: (i) movement or displacement of the imaging device 120; or (ii) movement or displacement of the objects being captured. For one embodiment, the adaptive bracketing logic/module 140 applies a local optical flow to align or register the images of the adaptive bracket with each other to compensate for any shifting between the images. Other image alignment/registration techniques (e.g., intensity-based registration algorithms, feature-based registration algorithms, etc.) can be used to align or register the images of the adaptive bracket with each other. For example, the local optical flow can be used alone or combined with at least one other image alignment/registration technique.

In addition to using image registration to compensate for unwanted shifting during capture of an adaptive bracket, the adaptive bracketing logic/module 140 can determine a threshold difference between corresponding portions in the first EV− image and the EV0 image using one or more image registration techniques that facilitate comparisons between the EV0 image and the first EV− image. For one embodiment, the adaptive bracketing logic/module 140 performs image registration on the first EV− image and the EV0 image to combine the image data from the different images into one coordinate system. For one embodiment, the adaptive bracketing logic/module 140 designates the EV0 image as a reference image for the image registration and the first EV− image as a target image that is aligned with the reference image (i.e., the EV0 image). An example of an image registration technique is local optical flow. For one embodiment, the adaptive bracketing logic/module 140 applies the image registration technique to the first EV− image and the EV0 image in order to minimize the pixel differences between corresponding portions of the two images (after accounting for exposure differences based on the exposure ratio between the first EV− image and the EV0 image). Here, when there are no differences between the first EV− image and the EV0 image, then application of the image registration technique to minimize the differences between the first EV− image and the EV0 image should result in the adaptive bracketing logic/module 140 determining that corresponding portions of the EV0 image and the first EV− image are the same. On the other hand, a failure of the applied image registration technique to minimize the differences between the first EV− image and the EV0 image will cause the adaptive bracketing logic/module 140 to determine that one or more corresponding portions of the first EV− image and the EV0 image are sufficiently different from each other.

Image registration can be performed using a variety of algorithms including, but not limited to, intensity-based algorithms, feature-based algorithms, linear transformation models, elastic or non-rigid transformation models, transformation models based on the law of function composition rather than addition, spatial domain algorithms for image registration, frequency domain algorithms for image registration, single-modality algorithms for image registration, multi-modality algorithms for image registration, manually performed image registration, interactive methods of image registration, semi-automatic methods of image registration, automatic methods of image registration, and image registration algorithms based on one or more image similarity measures that quantify a degree of similarity between intensity patterns in two images.

For a specific embodiment, the adaptive bracketing logic/module 140 registers the first EV− image with the EV0 image using one or more image registration algorithms that establish a correlation or degree of similarity between the first EV− image and the EV0 image. For example, the adaptive bracketing logic/module 140 determines a geometrical transformation using a correspondence between a number of points in the first EV− image and a corresponding number of points in the EV0 image. In this way, the first EV− image is mapped to the EV0 image. The determined geometrical transformation establishes a point-by-point correspondence between the EV0 image (i.e, the reference image) and the first EV− image (i.e., the target image). Based on the point-to-point correspondence, the adaptive bracketing logic/module 140 can determine that a degree of similarity between the first EV− image and the EV0 image. For one embodiment, the adaptive bracketing logic/module 140 determines a difference between corresponding portions in the first EV− image and the EV0 image when the degree of similarity between the first EV− image and the EV0 image is less than or equal to a threshold degree of similarity. For example, a degree of similarity can be based on requiring corresponding contiguous regions in the first and second images to include at least a predetermined number of pixels that are substantially aligned or registered with one another. For this example, when the corresponding contiguous regions in the first and second images include less than the predetermined number of pixels that should be aligned/registered with each other, the logic/module 140 determines that there is a difference between the corresponding portions in the first EV− image and the EV0 image.

It should be appreciated that a plurality of the embodiments above may be used to determine whether a threshold difference exists between two images. In some instances, a threshold difference may be determined to exist if any of a plurality of techniques identifies a threshold difference. In other instances, a threshold difference may be determined to exist only if a threshold difference is determined by multiple of the plurality of techniques.

In response to the logic/module 140 determining that there is a threshold difference between corresponding portions in the first EV− image and the EV0 image, the adaptive bracketing logic/module 140 can determine whether one or more portions of the second EV− image is better suited than the first EV− image for generating a HDR image with the EV0 image. That is, whether a portion of the second EV− image is more similar to the EV0 image than a corresponding portion of the first EV− image is similar to the EV0 image. The adaptive bracketing logic/module 140 can determine that the second EV− image is better than the first EV− image by determining that one or more pixel values of the second EV− image are closer to corresponding pixel value(s) of the EV0 image than corresponding pixel value(s) of the first EV− image are to the corresponding pixels value(s) of the EV0 image.

In some instances, after (or as part of) determining that the second EV− image is more similar to the EV0 image, the system may use the second EV− image to generate a HDR image. For example, although a threshold difference may be identified between the first EV− image and the EV0 image, the second EV− image may be compared to the EV0 image and no threshold difference may be identified. For this example, the first EV− image can be discarded from the adaptive bracket, while the second EV− image is retained in the adaptive bracket. Consequently, the second EV− image may be used, in combination with at least one of the EV0 image or the EV+ image of the adaptive bracket, to generate an HDR image. For another embodiment, the adaptive bracketing logic/module 140 generates a composite EV− image using the first EV− image and the second EV− image. The adaptive bracketing logic/module 140 can generate the composite image in response to the adaptive bracketing logic/module 140 determining that the second EV− image is better than the first EV− image, as described above. This may be beneficial in instances where in certain regions the first EV− image may be better suited than the second EV− image for HDR image generation, while in other regions the second EV− image may be better suited than the first EV− image for HDR image generation.

For one embodiment, the adaptive bracketing logic/module 140 generates a composite EV− image by combining portions of the first EV− image and the second EV− image. For example, a portion of the first EV− image is combined with a corresponding portion of the second EV− image. For this example, the portion of the first EV− image and the corresponding portion of the second EV− image are selected based, at least in part, on the corresponding portion of the second EV− image being more similar to a corresponding portion of the EV0 image than the portion of the first EV− image. For one embodiment, the combination of the first EV− image and the second EV− image by the adaptive bracketing logic/module 140 includes at least one of: (i) the adaptive bracketing logic/module 140 blending one or more portions of the first EV− image with corresponding portion(s) of the second EV− image; or (ii) the adaptive bracketing logic/module 140 replacing one or more portions of the first EV− image with corresponding portion(s) of the second EV− image. For one embodiment, the generation of the composite EV− image by the adaptive bracketing logic/module 140 includes the adaptive bracketing logic/module 140 combining the occluded and/or noisy portion of the first EV− image with a corresponding portion of the second EV− image.

For one embodiment, the adaptive bracketing logic/module 140 generates the composite EV− image by blending one or more portions of the first EV− image with corresponding portion(s) of the second EV− image. For one embodiment, the generation of the composite EV− image by the adaptive bracketing logic/module 140 includes blending the occluded and/or noisy portion of the first EV− image with a corresponding portion of the second EV− image. In this way, portions of the first EV− image that may result in ghosting artifacts can be minimized by blending one or more occluded and/or noisy portions of the first EV− image with corresponding portion(s) of the second EV− image that are more similar to corresponding portion(s) of the EV0 image.

For one embodiment, the adaptive bracketing logic/module 140 generates the composite EV− image by replacing one or more portions of the first EV− image with corresponding portion(s) of the second EV− image. For one embodiment, the generation of the composite EV− image by the adaptive bracketing logic/module 140 includes replacing the occluded and/or noisy portion of the first EV− image with a corresponding portion of the second EV− image. In this way, portions of the first EV− image that may result in ghosting artifacts can be minimized by replacing one or more occluded and/or noisy portions of the first EV− image with corresponding portion(s) of the second EV− image that are more similar to corresponding portion(s) of the EV0 image. Replacing one or more portions of the first EV− image with corresponding portion(s) of the second EV− image can assist with reducing the computational cost of generating the composite image by the system 100 when one or more algorithms that blend two images together are more resource-intensive than one or more algorithms that replace one image with another image. For example, and for one embodiment, the generation of the composite EV− image by the adaptive bracketing logic/module 140 includes replacing the first EV− image with the second EV− image.

After the adaptive bracketing logic/module 140 generates the composite EV− image, then the adaptive bracketing logic/module 140 can update the adaptive bracket. For one embodiment, the adaptive bracketing logic/module 140 updates the adaptive bracket by replacing the first EV− image and the second first EV− image with the composite EV− image. For example, and for one embodiment, an updated adaptive bracket is represented as follows:

$$[n_1(\text{Composite EV}-), \text{EV0}, n_2(\text{EV}+)],$$

where EV0 refers to an image that is captured using an ideal exposure value (EV) given the lighting conditions at hand, where $n_1$ and $n_2$ refer to numbers of stops below or above, respectively, the EV0 image, where $n_1$(Composite EV−) refers to an underexposed image that is formed from the First EV− image and the Second EV− image, described above in connection with FIG. 1, and where $n_2$(EV+) refers to an overexposed image that is captured at $n_2$ higher stops than the EV0 image.

The processing unit(s) 130 can also include an optional high dynamic range (HDR) generation logic/module 150, which receives the updated adaptive bracket as input. For one embodiment, the optional HDR generation logic/module 150 generates one or more HDR images using the updated adaptive bracket. In this way, the adaptive bracketing techniques performed by the adaptive bracketing logic/module 140 can assist with improving the functionality and operations of the system 100 used to generate HDR images. Computer functionality can be improved by enabling the system 100 that uses an adaptive bracket to generate HDR images to reduce or eliminate the need to apply de-ghosting algorithms to the generated HDR images, which can assist with reducing or eliminating wasted computational resources of the system 100 (e.g., storage space of memory 160, processing power of unit(s) 130, computational time associated with device 120, memory 160, and/or unit(s) 130, etc.) and/or improving the processing speed/power of the system 100. For one embodiment, the optional HDR generation logic/module 150 is implemented as at least one of hardware (e.g., electronic circuitry of the processing unit(s) 130), software (e.g., one or more instructions of a computer program executed by the processing unit(s) 130), or a combination thereof. The optional HDR generation logic/module 150 can be implemented in another system that differs from the system 100 (e.g., the logic/module 150 is implemented in processing unit(s) that are not part of the system 100, etc.).

The system 100 can include memory 160 for storing and/or retrieving image data 170 and/or metadata 180 associated with the image data 170. The image data 170 and/or the metadata 180 can be processed and/or captured by the other components of the system 100. Furthermore, other data (e.g., data captured by, processed by, and/or associated with at least one of processing unit(s) 130, peripheral(s) 190, and/or the imaging device 120, etc.) can be stored to and/or retrieved from the memory 160. The system 100 can also include a memory controller (not shown), which includes at least one electronic circuit that manages data flowing to and/or from the memory 160. The memory controller can be a separate processing unit or integrated as part of processing unit(s) 130. As explained above, one or more of the logic/modules 140 and 150 may be implemented as software (e.g., one or more instructions of a computer program executed by the processing unit(s) 130). For this embodiment, such software may be stored in the memory 160.

The system 100 can include an imaging device 120 that includes at least one of an imaging sensor, a lens assembly, or camera circuitry for capturing images—e.g., an adaptive bracket. For one embodiment, the imaging device 120 can include any known imaging component that enables image capture operations. For one embodiment, when the imaging device 120 includes a display device (e.g., a screen), the imaging device 120 can include a front-facing imaging device and/or a rear-facing imaging device. For this embodiment, the front-facing imaging device observes a scene in the same direction that the display device faces, while the rear-facing imaging device observes a scene in a direction that is different from the direction faced by the display device. Image sensor(s) of the device 120 can, for example, include a charge-coupled device (CCD) or complementary metal oxide semiconductor (CMOS) sensor. Imaging device 120 can also include an image signal processing (ISP) pipeline that is implemented as specialized hardware, software, or a combination of both. The ISP pipeline can perform one or more operations on raw images (also known as raw image files) received from image sensor(s) of the device 120. The ISP pipeline can also provide the processed image data to the memory 160, the optional peripheral(s) 190, and/or the processing unit(s) 130.

The system 100 can also include peripheral(s) 190. For one embodiment, the peripheral(s) 190 can include at least one of the following: (i) one or more input devices that interact with or send data to one or more components of the system 100 (e.g., mouse, keyboards, etc.); (ii) one or more output devices that provide output from one or more components of the system 100 (e.g., monitors, printers, display devices, etc.); or (iii) one or more storage devices that store data in addition to the memory 160. The peripheral(s) 190 may combine different devices into a single hardware component that can be used both as an input and output device (e.g., a touchscreen, etc.). The peripheral(s) 190 can also be referred to as input/output (I/O) devices 190 throughout this document. The system 100 can also include at least one peripheral control circuit (not shown), which can be a controller (e.g., a chip, an expansion card, or a stand-alone device, etc.) that interfaces with and is used to direct operation(s) of the peripheral(s) 190. The peripheral(s) controller can be a separate processing unit or integrated as one of the processing unit(s) 130.

The system 100 can include sensor(s) 191. For one embodiment, the sensor(s) 191 may include at least one sensor whose purpose is to detect a characteristic of one or more environs. For one embodiment, the sensor(s) 191 can be used to detect one or more environs associated with capturing and/or processing images—for example, one or more sensors for detecting motion during capturing or processing of an image, one or more sensors for detecting lighting conditions, etc. Examples of such sensors include, but are not limited to, an accelerometer, a proximity sensor, a vibration sensor, a gyroscopic sensor, a voltage sensor, a current sensor, a resistance sensor, a refraction sensor, a reflection sensor, a rotation sensor, a velocity sensor, an inclinometer, and a momentum sensor.

For one embodiment, the system 100 includes a communication mechanism 110. The communication mechanism 110 can be a bus, a network, or a switch. When the communication mechanism 110 is a bus, the communication mechanism 110 is a communication system that transfers data between components of system 100, or between components of system 100 and other components of other systems (not shown). As a bus, the communication mechanism 110 includes all related hardware components (wire, optical fiber, etc.) and/or software, including communication protocols. For one embodiment, the communication mechanism 110 can include at least one of an internal bus or an external bus. Moreover, the communication mechanism 110 can include at least one of a control bus, an address bus, or a data bus for communications associated with the system 100. For one embodiment, the communication mechanism 110 can be a network or a switch. As a network, the communication mechanism 110 may be any type of network such as a local area network (LAN), a wide area network (WAN) such as the Internet, a fiber network, a storage network, or a combination thereof, wired or wireless. When the communication mechanism 110 is a network, the components of the system 100 do not have to be physically located next to each other. When the mechanism 110 is a switch (e.g., a "cross-bar" switch), separate components of system 100 may be linked directly over a network even though these components may not be physically located next to each other. For example, at least two of the processing unit(s) 130, the communication mechanism 110, the memory 160, the peripheral(s) 190, the imaging device 120, or the sensor(s) 191 are in distinct physical locations from each other and are communicatively coupled via the communication mechanism 110, which is a network or a switch that directly links these components over a network.

For one embodiment, one or more components of the system 100 may be implemented as one or more integrated circuits (ICs). For example, at least one of the processing unit(s) 130, the communication mechanism 110, the imaging device 120, the peripheral(s) 190, the sensor(s) 191, or the memory 160 can be implemented as a system-on-a-chip (SoC) IC, a three-dimensional (3D) IC, any other known IC, or any known combination of ICs. For another embodiment, two or more of components of the system 100 are implemented together as one or more ICs. For example, at least two of the processing unit(s) 130, the communication mechanism 110, the memory 160, the peripheral(s) 190, the imaging device 120, or the sensor(s) 191 are implemented together as a single SoC IC.

Figure 2:
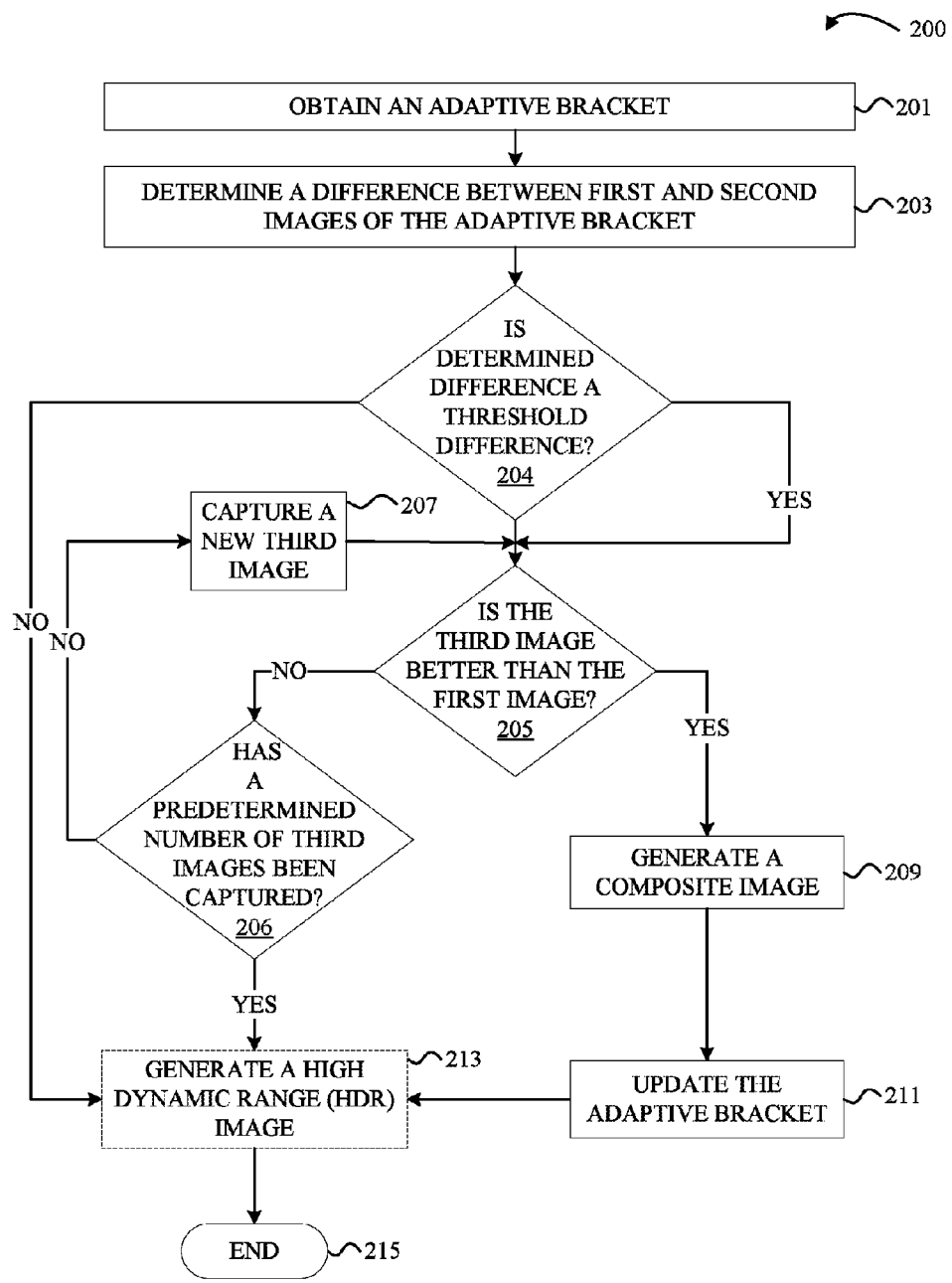
FIG. 2 is a flowchart representing one embodiment of a process of performing an adaptive bracketing technique.

Referring now to FIG. 2, which is a flowchart representing one embodiment of a process 200 of performing an adaptive bracketing technique. Process 200 can be performed by an adaptive bracketing logic/module (e.g., the adaptive bracketing logic/module 140 described above in connection with FIG. 1). Process 200 begins at block 201, where an adaptive bracket is obtained or captured. For one embodiment, an adaptive bracketing logic/module performing process 200 directs an imaging device (e.g., the imaging device 120 described above in connection with FIG. 1, etc.) to obtain an initial set of images of an adaptive bracket. The initial set of images of the adaptive bracket can include at least a first image (e.g., the first EV– image described above in connection with FIG. 1, etc.) and a second image (e.g., the EV0 image described above in connection with FIG. 1, etc.). In some instances, a third image (e.g., the second EV– image described above in connection with FIG. 1, etc.) may further be captured. For one embodiment, the adaptive bracket is obtained or captured according to at least one of the descriptions provided above in connection with FIG. 1.

Process 200 proceeds to block 203, where a difference is determined between the first and second images of the initial set of images of the adaptive bracket. For one embodiment, a difference is determined to look for one or more occlusions that may result from situations such as: (i) motion exists in a portion of first image but fails to exist in a corresponding portion of the second image (and vice versa); and/or (ii) noise exists in a portion of first image but fails to exist in a corresponding portion of the second image (and vice versa). For one embodiment, block 203 is performed according to one or more descriptions provided above in connection with FIG. 1. Next, process 200 proceeds to block 204. Here, an adaptive bracketing logic/module performing process 200 determines whether the determined difference is a threshold difference—that is, whether the determined difference is equal to or exceeds a threshold level of difference. The threshold difference may be determined using any embodiment described above or combination thereof. For one embodiment, the determined difference is a threshold difference when: (i) a contiguous region of pixels in one of the first and second images includes a threshold number of clipped pixels; and (ii) a corresponding region of pixels in the other one of the first and second images does not include a corresponding threshold number of clipped pixels. When the determined difference is not a threshold difference, process 200 proceeds to optional block 213 or block 215 (which are described below). On the other hand, when the determined difference is a threshold difference, process 200 proceeds to block 205, as described below.

At block 205, a comparison of the first and third images is performed. For one embodiment, this comparison is performed to determine whether a third image (or a region thereof) is better suited for generating a HDR image with the second image than the first image is—that is, whether the third image is more similar to the second image than the first image is to the second image. If a third image has not already been captured, block 205 may include capturing the third image. For example, and for one embodiment, the comparison includes determining whether a portion of the third image that corresponds to an occluded and/or noisy portion of the first image has pixel values that are higher and/or more noise-free than corresponding pixel values of the occluded and/or noisy portion in the first image. Block 205 can be performed according to descriptions provided above in connection with FIG. 1.

Process 200 proceeds from block 205 to decision block 206 when the third image is not better than the first image. For example, and for one embodiment, process 200 proceeds to decision block 206 when a portion of the third image that corresponds to an occluded and/or noisy portion of the first image has pixel values that are lower and/or less noise-free than corresponding pixel values of the occluded and/or noisy portion in the first image. At block 206, a determination is made as to whether a predetermined number of third images have been captured. If a predetermined number of third images has not been captured, process 200 proceeds to block 207 (which is described below). On the other hand, when a determination is made at block 206 that a predetermined number of third images have been captured, process 200 proceeds to optional block 213 or block 215 (which are described below). Decision block 206 may limit the number of additional images that may be captured in an effort to improve the quality of the adaptive bracket images. For one embodiment, the predetermined number from block 206 may be any suitable number (e.g., one, two, three). For example, block 207 will only be performed up to four times. If after the fourth time, the third image is still not better than the first image, process 200 proceeds to optional block 213 or block 215.

Process 200 proceeds from block 206 to block 207 when the third image is not better than the first image and when a predetermined number of third image has not been captured. Here, a new third image is captured by the device, and the previously captured third image is replaced with the new third image for the purposes of the process 200. In some instances, replacing the previously captured third image involves deleting the previously captured third image. The new third image is captured at the same exposure value as the first image. Next, process 200 returns to block 205 (which is described above) from block 207, and the newly captured image is compared to the first image.

Process 200 proceeds from block 205 to block 209 when the third image is better than the first image. For example, and for one embodiment, process 200 proceeds to block 209 when a portion of the third image that corresponds to the occluded and/or noisy portion of the first image has pixel values that are higher and/or more noise-free than corresponding pixel values of the occluded and/or noisy portion of the first image. At block 209, a composite image is generated using the first image and the third image, which can be done using one or more of the techniques discussed above. For one embodiment, the composite image is generated by combining one or more portions of the first image with one or more corresponding portions of the third image. Generating the composite image can include combining the occluded and/or noisy portion of the first image with a corresponding portion of the third image. For one embodiment, combining the first image and the third image includes at least one of: (i) blending one or more portions of the first image with corresponding portion(s) of the third image; or (ii) replacing one or more portions of the first image with corresponding portion(s) of the third image. At block 211 of process 200, the adaptive bracket is updated by adding the composite image to the adaptive bracket (which may also include replacing the first and third images with the composite image). For one embodiment, each of blocks 209 and 211 is performed according to one or more descriptions provided above in connection with FIG. 1. Next, process 200 proceeds to optional block 213, where the updated adaptive bracket is used to generate one or more HDR images. When process 200 proceeds from block 206 directly to block optional block 213, the one or more HDR images are generated using a conventional bracket (as opposed to an adaptive bracket). After optional block 213, process 200 ends at block 215. When optional block 213 is not part of process 200, process 200 ends at block 215 after performance of blocks 211, 206, or 204 (which are described above).

It should be appreciated that the process 200 (as well as the processes described below) may be performed on a region-by-region basis. For example, determining a threshold difference between the first and second images in block 204 may include identifying threshold differences in a plurality of regions within the image. Then, in block 205, the determination of whether the third image is better suited than the first image to be combined with the second image may be done on a region-by-region basis. If all regions of the third image are better suited, then the process may proceed to generate a composite image as discussed above with respect to block 209. If no regions of the third image are better suited, the process may proceed to block 206 as discussed above. If, however, there are some regions of the third image that are better suited and some regions of the third image that are not better suited, the process may both proceed to capture a new image as discussed above (if a limit on images captured has not been met) and generate a composite image using one or more of the techniques described above. In these instances, the newly captured image replaces the third image and the composite image replaces the first image for the purpose of block 205, such that the newly captured image is compared to the composite image in block 205. In this way, it may be possible for a composite image to be formed based on three or more images having a given exposure value, where different images can address occlusions from different regions.

Figure 3:
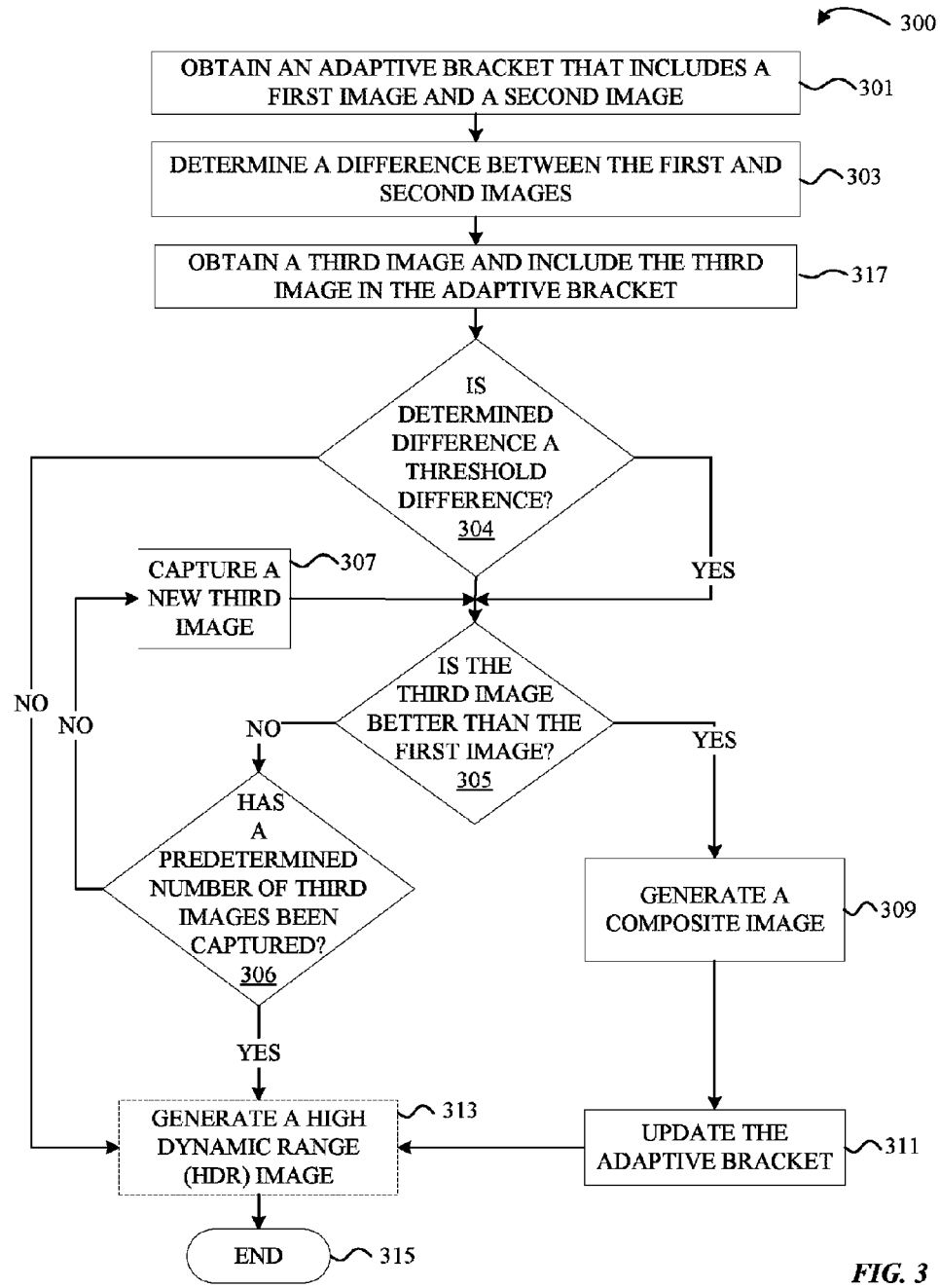
FIG. 3 is a flowchart representing another embodiment of a process of performing an adaptive bracketing technique.

FIG. 3 is a flowchart representing an embodiment of a process 300 of performing an adaptive bracketing technique. Process 300 can be performed by an adaptive bracketing logic/module (e.g., the logic/module 140 described above in connection with FIG. 1). Process 300 begins at block 301, where an adaptive bracket is obtained or captured. For one embodiment, an adaptive bracketing logic/module performing process 300 directs an imaging device (e.g., the imaging device 120 described above in connection with FIG. 1, etc.) to obtain or capture the adaptive bracket. The adaptive bracket can include: (i) a first image (e.g., the first EV− image described above in connection with FIG. 1, etc.); and (ii) a second image (e.g., the EV0 image described above in connection with FIG. 1, etc.). For one embodiment, the first and second images are obtained according to one or more descriptions provided above in connection with FIG. 1.

Process 300 proceeds to block 303, which is similar to or the same as block 203 of process 200 described above in connection with FIG. 2. Block 303 will not described again for the sake of brevity. Next, process 300 proceeds to block 317, where a third image that has the same EV as the first image is obtained and included in the adaptive bracket. For one embodiment, block 317 is performed in response to the performance of block 303. In this way, at least one embodiment of an adaptive bracket can be dynamically obtained (or obtained on-the-fly) in order to conserve computation resources. The third image is, for example, the second EV− image described above in connection with FIG. 1. For example, the third image is captured in response to a determination that the first image and the second image are different from each other, as described above in connection with FIG. 1. After block 317, process 300 proceeds to block 304, block 305, block 306, block 307, block 309, block 311, optional block 313, and block 315. Block 204, block 205, block 206, block 207, block 209, block 211, optional block 213, and block 215 of process 200 are similar to or the same as block 304, block 305, block 306, block 307, block 309, block 311, optional block 313, and block 315 of process 300, respectively. Block 204, block 205, block 206, block 207, block 209, block 211, optional block 213, and block 215 are described above in connection with FIG. 2. For the sake of brevity, these blocks are not described.

Figure 4:
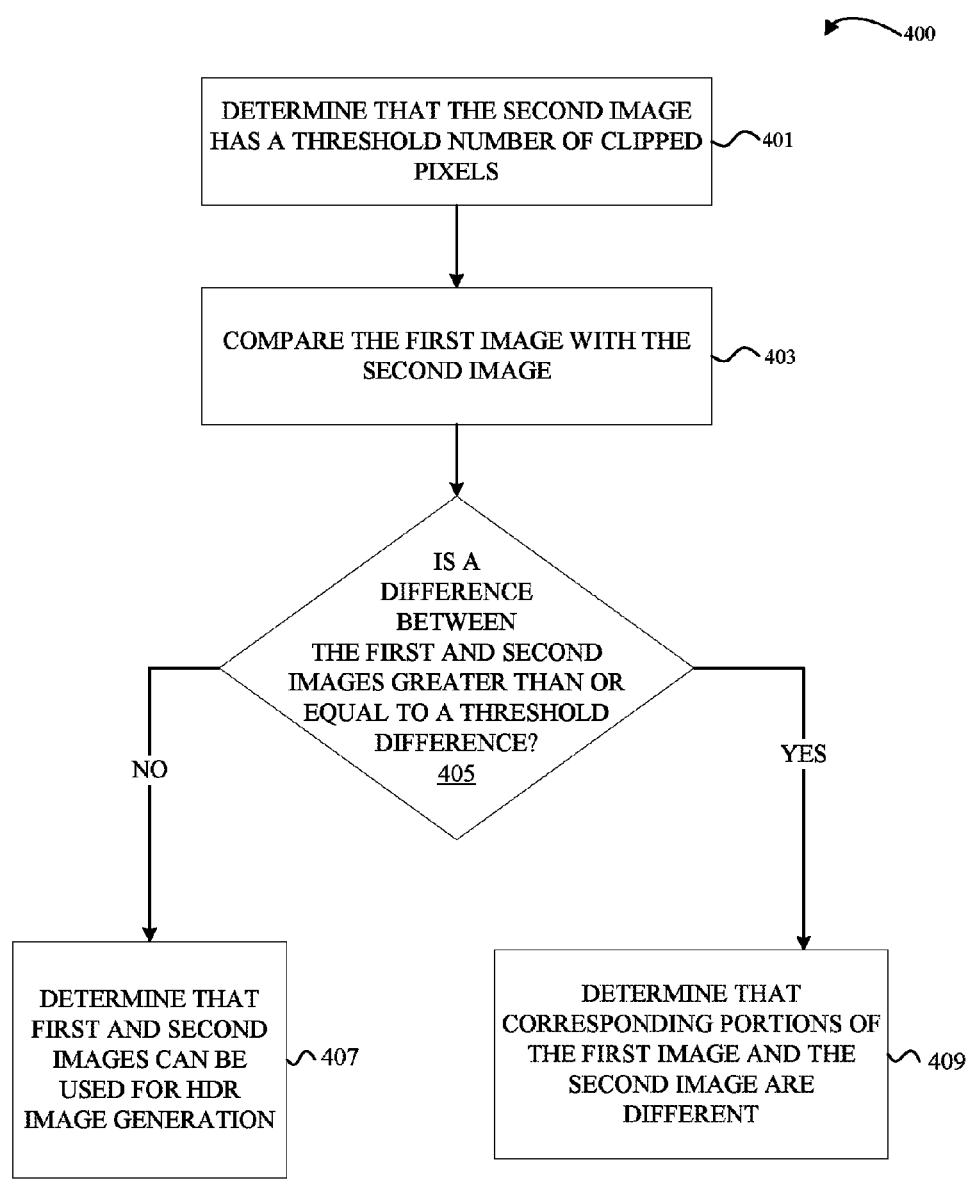
FIG. 4 is a flowchart representing one embodiment of a process of determining that there is a difference between corresponding portions of a first image and a second image during performance of an adaptive bracketing technique.

FIG. 4 is a flowchart representing one embodiment of a process 400 of determining that there is a difference between corresponding portions of a first image and a second image during performance of an adaptive bracketing technique. Process 400 provides additional details about the blocks 203-204 of process 200 and blocks 303-304 of process 300, which are described above in connection with FIGS. 2 and 3, respectively. Process 400 can be performed by an adaptive bracketing logic/module (e.g., the logic/module 140 described above in connection with FIG. 1). Process 400 begins at block 401, where a determination is made that the second image (e.g., the EV0 image described above in connection with FIG. 1) has a threshold number of clipped pixels. For one embodiment, the threshold number of clipped pixels in the second image triggers comparing corresponding portions of the first and second images. For one embodiment, block 401 is performed according to one or more descriptions provided above in connection with at least one of FIG. 1, 2, or 3. For one embodiment, a threshold number of clipped pixels is determined in order to avoid performing process 400 on a few spurious highlights just to rectify a minimal amount of clipped pixels. As such, at least one embodiment of block 401 comprises determining that the threshold number of clipped pixels includes a contiguous region of clipped pixels—not just isolated pixels in the image. For example, block 401 includes determining that a threshold of clipped pixels exist in a contiguous region of the EV0 image. This contiguous region could span the entire EV0 image in some scenarios.

Process 400 proceeds to block 403, where the second image is compared, on a pixel-by-pixel basis, with the first image (e.g., the first EV− image described above in connection with FIG. 1, etc.). For one embodiment, the comparison performed in block 403 is applicable to clipped pixels of the second image. Thus, for this embodiment, the clipped pixels of the second image are compared, on a pixel-by-pixel basis, with corresponding pixels of the first image. For one embodiment, block 403 is performed according to one or more descriptions provided above in connection with at least one of FIG. 1, 2, or 3.

At decision block 405, a determination is made about whether a difference between pixel values of the clipped pixels of the second image and corresponding pixel values of the corresponding pixels of the first image is greater than or equal to a threshold difference. For one embodiment, the threshold difference is based, at least in part, on an exposure ratio between the EV0 image and the first EV− image (as described above in connection with FIG. 1). For one embodiment, block 405 is performed based on a difference between overall pixel values of corresponding pixel neighborhoods in the first and second images exceeding a threshold difference. For one embodiment, block 405 is performed according to one or more descriptions provided above in connection with at least one of FIG. 1, 2, or 3. With regard to block 409, when at least one set of corresponding pixels of the first and second images has a difference in pixel values that is greater than or equal to a threshold difference, then a determination is made that corresponding portions of the first and second images are different. Consequently, block 409 can lead to additional processing operations associated with an adaptive bracket, as described in connection with at least FIG. 1, 2, or 3. At block 407, when at least one set of corresponding pixels of the first and second images has a difference in pixel values that is not greater than or equal to a threshold difference, then a determination is made that the first and second images can be used for generating an HDR image. Consequently, block 407 can lead to the first and second images being used in conjunction with other images (e.g., an EV+ image, etc.) to form a conventional bracket that is subsequently used to generate an HDR image. For one embodiment, each of blocks 407 and 409 is performed according to one or more descriptions provided above in connection with at least one of FIG. 1, 2, or 3.

Figure 5:
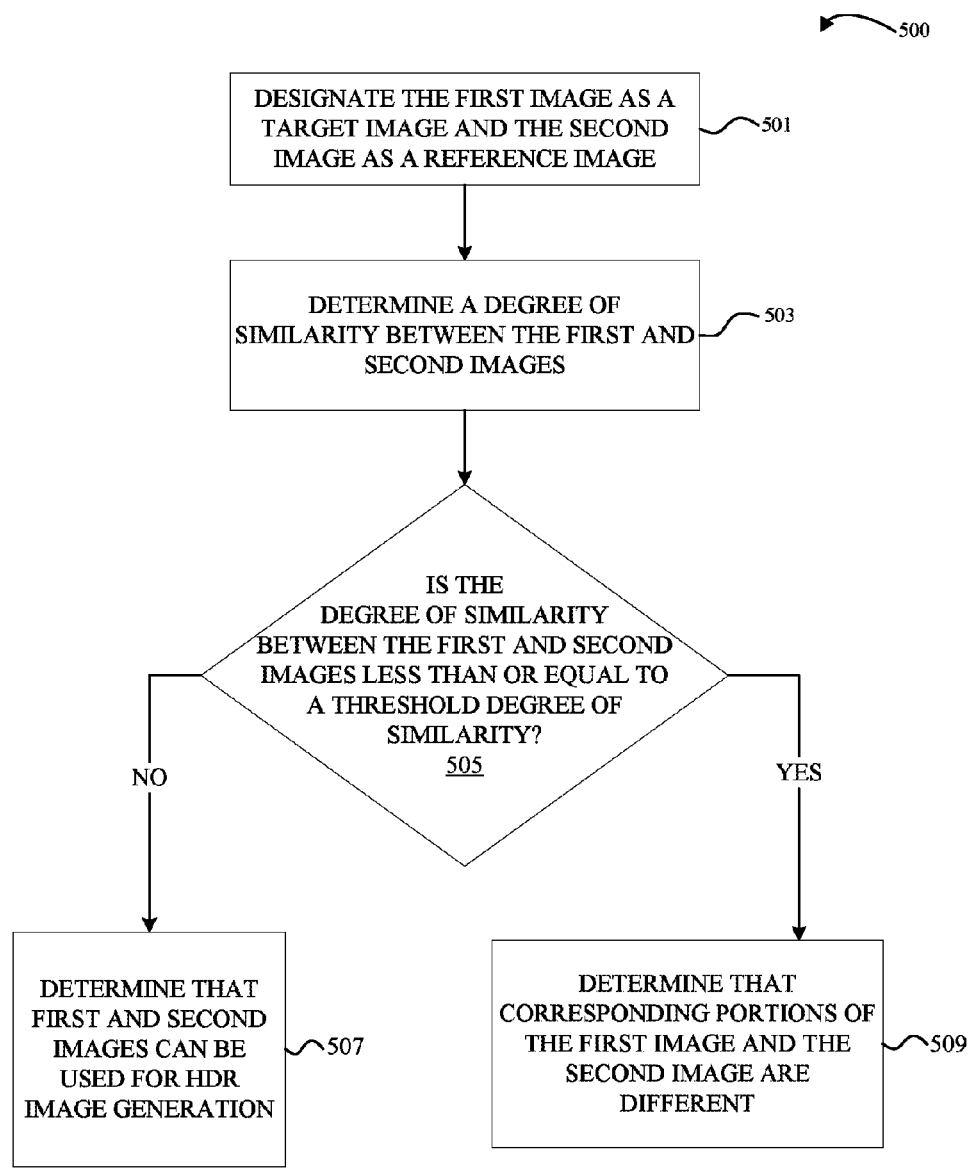
FIG. 5 is a flowchart representing another embodiment of a process of determining that there is a difference between corresponding portions of a first image and a second image during performance of an adaptive bracketing technique.

FIG. 5 is a flowchart representing another embodiment of a process 500 of determining that there is a difference between corresponding portions of a first image and a second image during performance of an adaptive bracketing technique. Process 500 provides additional details about the blocks 203-204 of process 200 and blocks 303-304 of process 300, which are described above in connection with FIGS. 2 and 3, respectively.

Process 500 can be performed by an adaptive bracketing logic/module (e.g., the logic/module 140 described above in connection with FIG. 1). Process 500 begins at block 501, where the first image (e.g., the first EV− image described above in connection with FIG. 1) is designated as a target image and the second image (e.g., the EV0− image described above in connection with FIG. 1) is designated as a reference image. For one embodiment, block 501 is performed according to descriptions provided above in connection with FIGS. 1, 2, and/or 3.

At block 503 of process 500, one or more image registration algorithms are used to determine a degree of similarity between the second image (i.e., the reference image)

and the first image (i.e., the target image). One example includes use of a geometrical transformation to establish a point-by-point correspondence between the first and second images, as described above in connection with at least FIG. 1. For one embodiment, block 503 is performed according to one or more descriptions provided above in connection with at least one of FIG. 1, 2, or 3. Next, block 505 requires a determination that a degree of similarity between the first and second images is less than or equal to a threshold degree of similarity. This can be based, at least in part, on contiguous regions in the first and second images as described above in connection with at least FIG. 1. For one embodiment, block 505 is performed according to descriptions provided above in connection with at least one of FIG. 1, 2, or 3.

For one embodiment of block 509, when a degree of similarity between the first and second images is less than or equal to a threshold degree of similarity, then a determination is made that there is a difference between corresponding portions of the first image and the second image. Consequently, block 509 can lead to additional processing operations associated with an adaptive bracket, as described in connection with at least FIG. 1, 2, or 3. At block 507, when a degree of similarity between the first and second images is not less than or equal to a threshold degree of similarity, then a determination is made that the first and second images can be used for generating an HDR image. Consequently, block 507 can lead to the first and second images being used in conjunction with other images (e.g., an EV+ image, etc.) to form a conventional bracket that is subsequently used to generate an HDR image. For one embodiment, blocks 507 and 509 are performed according to descriptions provided above in connection with FIGS. 1, 2, and/or 3.

Figure 6:
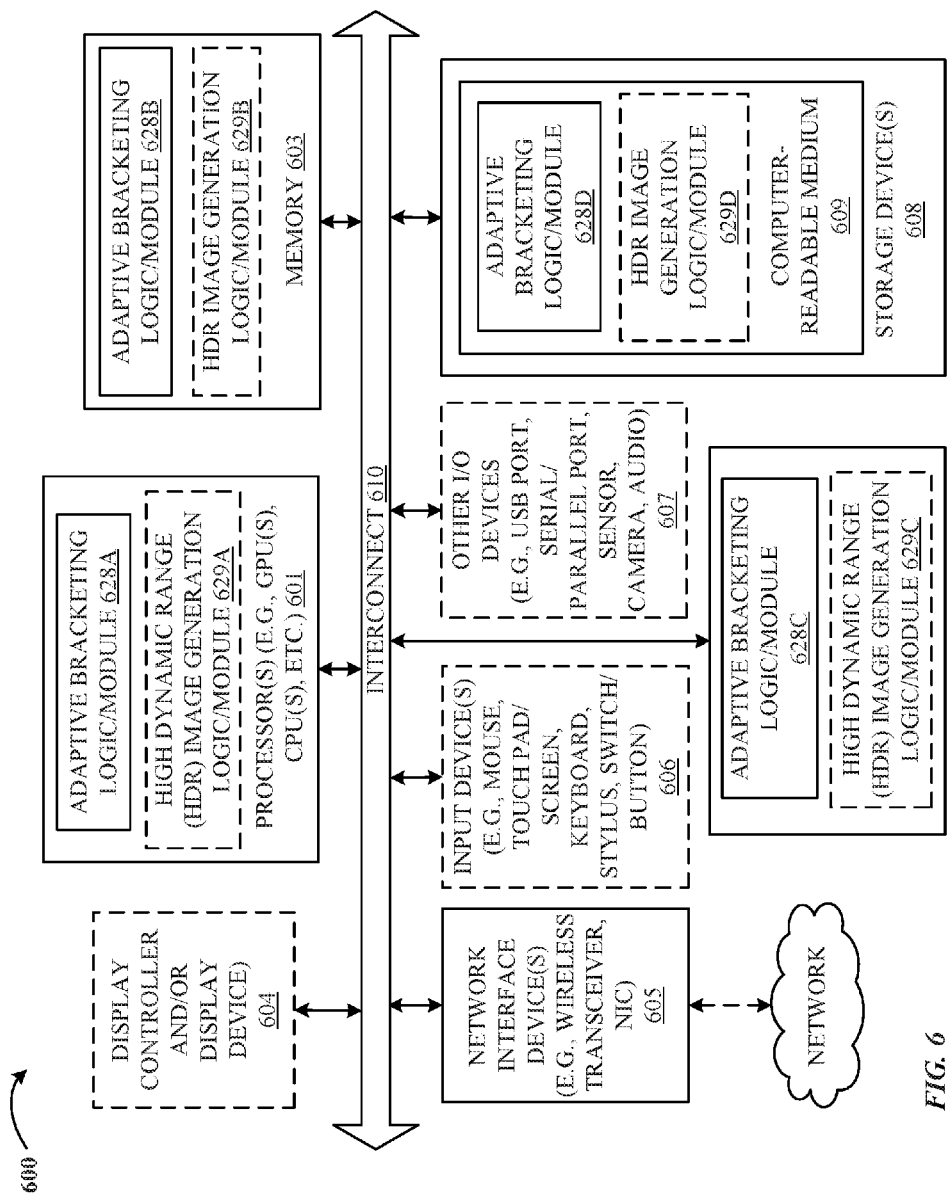
FIG. 6 illustrates an exemplary processing system that can assist with performing an adaptive bracketing technique according to one or more of the embodiments described herein.

FIG. 6 is a block diagram illustrating an example of a data processing system 600 that may be used with one embodiment. For example, the system 600 may represent any of the data processing systems described above performing any of the processes or methods described above in connection with at least one of FIG. 1, 2, 3, 4, or 5.

System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high-level view of many components of the computer system. Nevertheless, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute at least one set of instructions to perform any of the methodologies discussed herein.

For one embodiment, system 600 includes processor(s) 601, memory 603, and devices 605-608 via a bus or an interconnect 610. Processor(s) 601 may represent a single processor or multiple processors with a single processor core or multiple processor cores included therein. Processor(s) 601 may represent one or more general-purpose processors such as a microprocessor, a central processing unit (CPU), or the like. More particularly, processor(s) 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor(s) 601 may also be one or more special-purpose processors such as an application specific integrated circuit (ASIC), an Application-specific instruction set processor (ASIP), a cellular or baseband processor, a field programmable gate array (FPGA), a digital signal processor (DSP), a physics processing unit (PPU), an image processor, an audio processor, a network processor, a graphics processor, a graphics processing unit (GPU), a network processor, a communications processor, a cryptographic processor, a co-processor, an embedded processor, a floating-point unit (FPU), or any other type of logic capable of processing instructions.

Processor(s) 601, which may be a low power multi-core processor socket such as an ultra-low voltage processor, may act as a main processing unit and central hub for communication with the various components of the system. Such processor can be implemented as a system-on-chip (SoC) IC. At least one of adaptive bracketing logic/module 628A or optional HDR generation module 629A may reside, completely or at least partially, within processor(s) 601. Furthermore, the processor(s) 601 is configured to execute instructions for performing the operations and methodologies discussed herein—for example, any of the processes or methods described above in connection with at least one of FIG. 1, 2, 3, 4, or 5. System 600 may further include a graphics interface that communicates with optional graphics subsystem 604, which may include a display controller, a graphics processing unit (GPU), and/or a display device. For one embodiment, the processor(s) 601 includes at least one of adaptive bracketing logic/module 628A or optional HDR generation module 629A, which enables processor(s) 601 to perform any, all, or some of the processes or methods described above in connection with at least one of FIG. 1, 2, 3, 4, or 5.

Processor(s) 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor(s) 601 or any other device. For example, executable code and/or data of a variety of operating systems, device drivers, firmware (e.g., input output basic system or BIOS), and/or applications can be loaded in memory 603 and executed by processor(s) 601. An operating system can be any kind of operating system. Performance control logic/module 628D may also reside, completely or at least partially, within memory 603. For one embodiment, the memory 603 includes at least one of adaptive bracketing logic/module 628B or optional HDR generation module 629B, which are instructions. When the instructions represented by at least one of adaptive bracketing logic/module 628B or optional HDR generation module 629B are executed by the processor(s) 601, the instructions 628B and/or instructions 629B cause the processor(s) 601 to perform any, all, or some of the processes or methods described above in connection with at least one of FIG. 1, 2, 3, 4, or 5.

System 600 may further include I/O devices such as devices 605-608, including network interface device(s) 605, optional input device(s) 606, and other optional I/O device (s) 607. Network interface device 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with display device 604), a pointer device such as a stylus, and/or a keyboard (e.g., physical keyboard or a virtual keyboard displayed as part of a touch sensitive screen). For example, input device 606 may include a touch screen controller coupled to a touch screen. The touch screen and touch screen controller can, for example, detect contact and movement or a break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

I/O devices 607 may include an audio device. An audio device may include a speaker and/or a microphone to facilitate voice-enabled functions, such as voice recognition, voice replication, digital recording, and/or telephony functions. Other I/O devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor(s) 601. For various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. In addition, a flash device may be coupled to processor(s) 601, e.g., via a serial optional peripheral interface (SPI). This flash device may provide for non-volatile storage of system software, including a basic input/output software (BIOS) and other firmware.

Furthermore, at least one of adaptive bracketing logic/ module 628C or optional HDR generation module 629C may be a specialized stand-alone computing device that is formed from hardware, software, or a combination thereof. For one embodiment, at least one of adaptive bracketing logic/module 628C or optional HDR generation module 629C performs any, all, or some of the processes or methods described above in connection with at least one of FIG. 1, 2, 3, 4, or 5.

Storage device 608 may include computer-accessible storage medium 609 (also known as a machine-readable storage medium or a computer-readable medium) on which is stored one or more sets of instructions or software (e.g., at least one of adaptive bracketing logic/module 628D or optional HDR generation module 629D) embodying one or more of the methodologies or functions described above in connection with FIG. 1, 2, 3, 4, or 5. For one embodiment, the storage device 608 includes at least one of adaptive bracketing logic/module 628D or optional HDR generation module 629D, which are instructions. When the instructions represented by at least one of adaptive bracketing logic/module 628D or optional HDR generation module 629D are executed by the processor(s) 601, the instructions 628D and/or the instructions 629D cause the processor(s) 601 to perform any, all, or some of the processes or methods described above in connection with at least one of FIG. 1, 2, 3, 4, or 5. One or more of logic/modules 628A, 628B, 628C, 628D, 629A, 629B, 629C, or 629D may be transmitted or received over a network via network interface device 1305.

Computer-readable storage medium 609 can store some or all of the software functionalities of at least one of adaptive bracketing logic/module 628D or optional HDR generation module 629D described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Note that while system 600 is illustrated with various components of a data processing system, it is not intended to represent any particular architecture or manner of interconnecting the components; as such, details are not germane to the embodiments described herein. It will also be appreciated that network computers, handheld computers, mobile phones, servers, and/or other data processing systems, which have fewer components or perhaps more components, may also be used with the embodiments described herein.

Description of at least one of the embodiments set forth herein is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the embodiments. In other instances, well-known processes and manufacturing techniques have not been described in particular detail in order to not unnecessarily obscure the embodiments. Reference throughout this specification to "one embodiment," "an embodiment," "another embodiment," "other embodiments," "some embodiments," and their variations means that a particular feature, structure, configuration, or characteristic described in connection with the embodiment is included in at least one embodiment. Thus, the appearances of the phrase "for one embodiment," "for an embodiment," "for another embodiment," "in other embodiments," "in some embodiments," or their variations in various places throughout this specification are not necessarily referring to the same embodiment. Furthermore, the particular features, structures, configurations, or characteristics may be combined in any suitable manner in one or more embodiments.

In the following description and claims, the terms "coupled" and "connected," along with their derivatives, may be used. It should be understood that these terms are not intended as synonyms for each other. "Coupled" is used to indicate that two or more elements or components, which may or may not be in direct physical or electrical contact with each other, co-operate or interact with each other. "Connected" is used to indicate the establishment of communication between two or more elements or components that are coupled with each other.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

Although the processes or methods are described above in terms of some sequential operations, it should be appreciated that some of the operations described may be performed in a different order. Moreover, some operations may be performed in parallel rather than sequentially. Embodiments described herein are not described with reference to any particular programming language. It will be appreciated that a variety of programming languages may be used to implement the teachings of embodiments of the invention as described herein. In utilizing the various aspects of the embodiments described herein, it would become apparent to one skilled in the art that combinations, modifications, or variations of the above embodiments are possible for managing components of processing system to increase the power and performance of at least one of those components. Thus, it will be evident that various modifications may be made thereto without departing from the broader spirit and scope of at least one of the inventive concepts set forth in the following claims. The specification and drawings are, accordingly, to be regarded in an illustrative sense rather than a restrictive sense.

In the development of any actual implementation of one or more of the inventive concepts set forth in the embodiments described herein (e.g., as a software and/or hardware development project, etc.), numerous decisions must be made to achieve the developers' specific goals (e.g., compliance with system-related constraints and/or business-related constraints). These goals may vary from one implementation to another, and this variation could affect the actual implementation of one or more of the inventive concepts set forth in the embodiments described herein. Furthermore, such development efforts might be complex and time-consuming, but would nevertheless be a routine undertaking for a person having ordinary skill in the art in the design and/or implementation of one or more of the inventive concepts set forth in the embodiments described herein.

As used herein, the phrase "at least one of A, B, or C" includes A alone, B alone, C alone, a combination of A and B, a combination of B and C, a combination of A and C, and a combination of A, B, and C. In other words, the phrase "at least one of A, B, or C" means A, B, C, or any combination thereof such that one or more of a group of elements consisting of A, B and C, and should not be interpreted as requiring at least one of each of the listed elements A, B and C, regardless of whether A, B and C are related as categories or otherwise. Furthermore, the use of the article "a" or "the" in introducing an element should not be interpreted as being exclusive of a plurality of elements. Also, the recitation of "A, B and/or C" is equal to "at least one of A, B or C."

What is claimed is:

1. A computer-implemented method for adaptive bracketing, comprising:
    capturing, as part of an adaptive bracket, a first image at a first exposure value, a second image at a second exposure value, and a third image at the first exposure value, wherein the first exposure value is an underexposed exposure value in comparison to the second exposure value;
    determining a difference between the first image and the second image;
    determining that the third image is more similar to the second image than the first image; and
    generating a composite image using the first image and the third image in response to the determination that the third image is more similar to the second image than the first image.

2. The method of claim 1, further comprising:
    updating the adaptive bracket by replacing the first and third images with the composite image; and
    generating one or more high dynamic range (HDR) images using the updated adaptive bracket.

3. The method of claim 1, wherein the third image is captured after the first and second images have been captured.

4. The method of claim 3, wherein the third image is captured in response to the determination of the difference between the first image and the second image.

5. The method of claim 1, wherein determining the difference between the first image and the second image is based, at least in part, on a pixel-by-pixel comparison of clipped pixels of the second image with corresponding pixels of the first image.

6. The method of claim 1, wherein determining the difference between the first image and the second image is based, at least in part, on one or more image registration algorithms.

7. The method of claim 1, wherein generating the composite image using the first image and the third image includes:
combining a portion of the first image with a corresponding portion of the third image, wherein the portion of the first image and the corresponding portion of the third image are selected based, at least in part, on the corresponding portion of the third image being more similar to a corresponding portion of the second image than the portion of the first image.

8. A non-transitory computer readable medium comprising instructions, which when executed by one or more processors, cause the one or more processors to:
capture, as part of an adaptive bracket, a first image at a first exposure value, a second image at a second exposure value, and a third image at the first exposure value, wherein the first exposure value is an underexposed exposure value in comparison to the second exposure value;
determine a difference between the first image and the second image;
determine that the third image is more similar to the second image than the first image; and
generate a composite image using the first image and the third image in response to the determination that the third image is more similar to the second image than the first image.

9. The non-transitory computer readable medium of claim 8, wherein the instructions further comprise additional instructions, which when executed by the one or more processors, cause the one or more processors to:
update the adaptive bracket by replacing the first and third images with the composite image; and
generate one or more high dynamic range (HDR) images using the updated adaptive bracket.

10. The non-transitory computer readable medium of claim 8, wherein the instructions that cause the one or more processors to capture the third image include instructions that cause the one or more processors to capture the third image after the first and second images have been captured.

11. The non-transitory computer readable medium of claim 10, wherein the instructions that cause the one or more processors to capture the third image after the first and second images have been captured include instructions that cause the one or more processors to capture the third image in response to the determination of the difference between the first image and the second image.

12. The non-transitory computer readable medium of claim 8, wherein the instructions for causing the one or more processors to determine a difference between the first image and the second image include one or more instructions for causing the one or more processors to:
determine the difference between the first image and the second image based on a pixel-by-pixel comparison of clipped pixels of the second image with corresponding pixels of the first image.

13. The non-transitory computer readable medium of claim 8, wherein the instructions for causing the one or more processors to determine a difference between the first image and the second image include one or more instructions for causing the one or more processors to:
determine the difference between the first image and the second image based on one or more image registration algorithms.

14. The non-transitory computer readable medium of claim 8, wherein the instructions for causing the one or more processors to generate the composite image using the first image and the third image includes one or more instructions for causing the one or more processors to:
combine a portion of the first image with a corresponding portion of the third image, wherein the portion of the first image and the corresponding portion of the third image are selected based, at least in part, on the corresponding portion of the third image being more similar to a corresponding portion of the second image than the portion of the first image.

15. A processing system, comprising:
an imaging device comprising one or more image sensors; and
logic coupled to the imaging device, the logic being configured to:
cause the imaging device to capture, as part of an adaptive bracket, a first image at a first exposure value, a second image at a second exposure value, and a third image at the first exposure value, wherein the first exposure value is an underexposed exposure value in comparison to the second exposure value;
determine a difference between the first image and the second image;
determine that the third image is more similar to the second image than the first image; and
generate a composite image using the first image and the third image in response to the determination that the third image is more similar to the second image than the first image.

16. The system of claim 15, wherein the logic is further configured to:
update the adaptive bracket by replacing the first and third images with the composite image; and
generate one or more high dynamic range (HDR) images using the updated adaptive bracket.

17. The system of claim 15, wherein the logic being configured to capture the third image includes the logic being configured to capture the third image after the first and second images have been captured.

18. The system of claim 15, wherein the logic being configured to capture the third image after the first and second images have been captured includes the logic being configured to capture the third image in response to the determination of the difference between the first image and the second image.

19. The system of claim 15, wherein the logic being configured to determine a difference between the first image and the second image includes the logic being configured to:
determine the difference between the first image and the second image based on a pixel-by-pixel comparison of clipped pixels of the second image with corresponding pixels of the first image.

20. The system of claim 15, wherein the logic being configured to determine a difference between the first image and the second image includes the logic being configured to:
determine the difference between the first image and the second image based on one or more image registration algorithms.

21. The system of claim 15, wherein the logic being configured to generate the composite image using the first image and the third image includes the logic being configured to:
  combine a portion of the first image with a corresponding portion of the third image, wherein the portion of the first image and the corresponding portion of the third image are selected based, at least in part, on the corresponding portion of the third image being more similar to a corresponding portion of the second image than the portion of the first image.

* * * * *